Patented Sept. 3, 1946

2,407,161

UNITED STATES PATENT OFFICE 2,407,161

ACYL DICYANDIAMIDES AND SALTS THEREOF

Donald W. Kaiser and Jack T. Thurston, Riverside, Conn., assignors to American Cyanamid Company, New York, N. Y., a corporation of Maine No Drawing. Application May 30, 1942, Serial No. 445,206

15 Claims. (Cl. 260—551)

This invention relates to new chemical compounds and their preparation, more particularly to acyl dicyandiamide and a method of preparing the same.

Although dicyandiamide,

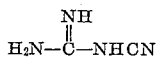

is a compound having an almost completely neutral reaction in water, its dissociation constant having been reported as $0.6 \times 10^{-14}$ at 25° C., we have found that it will react with acylating agents in the presence of an alkali metal or alkaline earth metal oxide or hydroxide and water to yield acylated dicyandiamides.

The reaction whereby our new acyl dicyandiamides are prepared is brought about by simply mixing dicyandiamide with a desired acylating agent of the type to be hereinafter described and a water-soluble alkali metal or alkaline earth metal oxide or hydroxide in the presence of water. The amount of water employed in the reaction mixture should be comparatively small and in some cases the water present in the reagents is sufficient for the purpose. In order to conduct the reaction in a fluid medium the water may be supplemented with other solvents preferably non-hydroxylated and also preferably miscible with water. Non-hydroxylated solvents are preferred since hydroxylated solvents such as alcohol tend to react with the acyl halides. Of these solvents, dioxane and acetone have been used with good results. Ether and benzene may also be employed as solvents for the acylating agent but since they are not miscible with water they are not usually employed. Ordinarily only enough solvent, including water, is employed to solubilize the reactants.

Although the reaction is ordinarily carried out at about room temperatures it may in some cases be advantageous to cool the reaction mixture to decrease the tendency of side reactions to occur. Although elevated temperatures may be employed temperatures in excess of about 60° C. should not be maintained for any appreciable time because of the tendency of dicyandiamide and the reaction product itself to decompose at high temperatures.

The product formed in the alkaline reaction mixture is the corresponding alkali metal or alkaline earth metal salt of an acyl dicyandiamide. The acylated dicyandiamide itself may be recovered as such from the solution of its salt by neutralization with an acid preferably a weak acid such as acetic or propionic, although mineral acids such as HCl, $H_2SO_4$, $H_3PO_4$, $H_2SO_3$, etc., may be employed. Neutralization of the alkaline reaction mixture with such acids will cause the precipitation of the acyl dicyandiamide as such. The crystalline product may then be recovered by decantation or filtration and purified by washing and/or recrystallization as described in the specific examples.

The reaction may be carried out with any water soluble alkali metal or alkaline earth metal oxide or hydroxide such as those of sodium, potassium, barium, strontium, lithium, etc. Since water is present in the reaction mixture the addition of an oxide is equivalent to the addition of a corresponding hydroxide, and hereinafter and in the claims, reference to the use of an alkali metal or an alkaline earth metal hydroxide contemplates the use of the corresponding oxide. The amount of alkali metal or alkaline earth metal hydroxide employed should be sufficient to give the reaction mixture a strongly alkaline reaction and therefore when employing acylating agents having neutralizable acid groups the amount of alkaline material should be sufficient to react with these groups and still provide an excess alkali. It is also pointed out that during the reaction an acid group is formed, HCl when using an acyl chloride and a carboxylic acid group when using an acid anhydride as acylating agent, and therefore sufficient alkali must be used to neutralize these groups.

Although the mechanism of our reaction has not been definitely established as yet we believe that it involves the formation of an alkali metal or alkaline earth metal salt of dicyandiamide in an intermediate stage. Accordingly an alkali metal or an alkaline earth metal salt of dicyandiamide may be employed in the reaction mixture and the corresponding alkali eliminated. However, the alkali metal or alkaline earth metal of dicyandiamide hydrolyzes so easily in the presence of water that in effect the reaction mixture comprises an acylating agent, dicyandiamide and an alkali metal or alkaline earth metal hydroxide.

In the reaction mixture we may use acylating agents such as the acyl halides and acid anhydrides. Of the acyl halides we prefer the acyl chlorides because of their greater availability and cheapness but we may use the acyl bromides and in some cases the acyl iodides to good advantage. These acylating agents may be aliphatic, alicyclic or aromatic in character and the alkyl, cycloalkyl or aryl radical may be substituted with a wide variety of substituents. Representative of the acylating agents that may be employed are the acid halides or anhydrides of straight and branched chain, saturated and unsaturated, primary, secondary and tertiary aliphatic carboxylic acids such as acetic, propionic, caproic, caprylic, lauric, oleic, palmitic, stearic, etc.; substituted aliphatic carboxylic acids such as α-brom caproic, 9,11-di-chlorostearic, γ-nitrovaleric, β-N-acetylbutylaminopropionic, ω-hydroxydecanoic, ω-carboxyvaleric, etc.

Other acylating agents which may be employed by us in our process include the acid halides or anhydrides of aliphatic and aromatic polycarboxylic acids such as sebacic acid, adipic acid, succinic acid, γ-methylitaconic acid, citric acid, phthalic acid, hexahydrophthalic acid and others. We may also employ the acid halides or anhydrides of acids such as benzoic acid, p-aminobenzoic acid, p-acetylaminobenzoic acid, p-nitrobenzoic acid, p-hydroxybenzoic acid, p-acetoxybenzoic acid, α-naphthoic acid, β-5-sulfonaphthoic acid, cyclohexylacetic acid, hexahydrobenzoic acid, cyclopentylacetic acid and others of related character.

When employing as acylating agents the halides of polycarboxylic acids such as sebacyl chloride, adipyl chloride, hexahydrophthalyl chloride, phthalyl chloride, etc., products are obtained having two dicyandiamide radicals such as sebacyl bis-dicyandiamide and adipyl bis-dicyandiamide. These compounds are also acylated dicyandiamides and fall within the scope of our invention.

Our invention will now be illustrated by means of the following specific examples which are given, however, by way of illustration only, and are not to be construed as limiting our invention thereto; since obviously other acylating agents and reaction conditions may be employed without departing from the scope of the invention as set forth in the appended claims.

EXAMPLE 1

Benzoyl dicyandiamide 63.5 g. of 95% sodium hydroxide dissolved in 125 cc. of water were placed in a three-necked flask provided with a stirrer, dropping funnel, and thermometer. 63 g. of pulverized dicyandiamide was added to the sodium hydroxide solution with stirring until dissolved. 150 cc. of acetone was then added. The resulting double layer was agitated thoroughly and the temperature kept between 20–25° C. while 70.25 g. of benzoyl chloride was added in the course of ½ hour. During this time a solid separated but addition of water after the reaction was complete gave a clear, very light yellow solution. Acidification of the solution with acetic acid precipitated a colorless solid which was filtered, washed well with water and allowed to air dry. The product, benzoyl dicyandiamide, was recovered with a yield of 71.5%.

A sample of the above product was purified by rapid crystallization from butanol to yield beautiful plate-like crystals decomposing at 190–191° C. when heated. Chemical analysis of the product checked closely with the calculated values for $C_9H_8N_4O$.

EXAMPLE 2

Benzoyl dicyandiamide

To 16.8 grams of finely pulverized dicyandiamide and 18 g. of 95% sodium hydroxide suspended in 250 cc. of dioxane, 28.1 g. of benzoyl chloride was added gradually with stirring. The temperature of the reaction mixture was kept below 40° C. throughout the reaction. The resulting solid product was filtered, dissolved in water and acidified with acetic acid. The crystalline precipitate, benzoyl dicyandiamide, was recovered by filtration with a yield of 40%.

EXAMPLE 3

Acetyl dicyandiamide

To a solution of 42.2 g. of 95% sodium hydroxide in 100 cc. of water was added 50.4 g. of dicyandiamide and 250 cc. of acetone. The mixture was stirred and 51 g. of acetic anhydride was added at such a rate that the temperature was maintained at 35–40° C. After addition of the acetic anhydride, water was added and the clear solution acidified with acetic acid whereupon colorless crystals of acetyl dicyandiamide were obtained. The product was washed well with water and allowed to dry.

20 g. of acetyl dicyandiamide were crystallized from hot water containing about 10% of Cellosolve. After filtering and drying an amorphous appearing solid was obtained which decomposed at 240° C. when immersed in a hot oil bath at this temperature. Chemical analysis of the purified sample gave the following results:

|  | Per cent C | Per cent H | Per cent N |
|---|---|---|---|
| Calculated for $C_4H_6N_4O$ | 38.08 | 4.76 | 44.44 |
| Found | 38.19 | 4.98 | 44.18 |

EXAMPLE 4

Caproyl dicyandiamide

A solution of 84.4 g. of 95% sodium hydroxide in 300 cc. of water was prepared and divided into two equal portions. One part was placed in a three-necked flask equipped with a stirrer, thermometer and two dropping funnels. 126 g. of dicyandiamide and 300 cc. of acetone were added to the caustic soda solution in the flask. The mixture in the flask was stirred and maintained at 20° C. while the second portion of the alkali solution was added simultaneously with 134.5 g. of caproyl chloride. After the addition was completed the reaction mixture was diluted with water and acidified with acetic acid whereby a colorless solid was precipitated. The material was filtered, and washed well with water. When dry the crystals melted at 171–173° C. Crystallization of 103 g. of the product, caproyl dicyandiamide, from 95% ethyl alcohol gave 76 g. of beautiful, large plate-like crystals which melted at 179–180° C. Dilution of the filtrate gave an additional crop of crystals weighing 18 g. when dried and melting at 179–180° C. Chemical analysis of the purified product gave the following results:

|  | Per cent C | Per cent H | Per cent N |
|---|---|---|---|
| Calculated for $C_8H_{14}N_4O$ | 52.74 | 7.69 | 30.76 |
| Found | 52.95 | 7.77 | 30.45 |

EXAMPLE 5

Lauroyl dicyandiamide

To a solution containing 66 g. of 85% potassium hydroxide in 200 cc. of water was added 126 g. of dicyandiamide and 300 cc. of acetone. The mixture was cooled to 20° C. and stirred while 219 g. of lauroyl chloride was slowly added simultaneously with another solution of 66 g. of potassium hydroxide in 100 cc. of water. The mixture was then acidified with acetic acid diluted with water and the precipitated product filtered as dry as possible. The damp solid was dissolved in hot acetone and a little Cellosolve, decolorizing carbon was added and the material filtered. On cooling, glistening, colorless plates separated. A portion of these crystals were dissolved in methyl ethyl ketone and recrystallized to give beautiful plates which melted at 166–167° C. On chemical analysis the carbon, hydrogen and nitrogen values gave close agreement with the theoretical values for the lauroyl dicyandiamide, $C_{14}H_{26}N_4O$.

Example 6

(A) *Sebacyl bis-dicyandiamide*

(B) *ω-Carboxypelargonyl dicyandiamide*

168 g. of dicyandiamide was suspended in a mixture of 100 cc. of water and 200 cc. of acetone and 320 cc. of 50% aqueous solution of sodium hydroxide was added to the cold suspension. 179 g. (.75 mole) of crude sebacyl chloride, prepared by treating sebacic acid with a slight excess of thionyl chloride and heating until no more HCl was evolved, was added slowly over a period of 1.5 hours, during which time the solution was vigorously stirred and cooled to 5–10° C. Stirring was continued for ½ hour more and the reaction mixture made neutral with hydrochloric acid. A gray white precipitate of sebacyl bis-dicyandiamide was obtained. The product was purified by dissolving it in 2 liters of water containing 100 cc. of 50% sodium hydroxide. The solution was then filtered and the product precipitated by making the solution neutral with hydrochloric acid. After washing with water the product was vacuum dried.

The filtrate obtained from the recovery of the crude sebacyl bis-dicyandiamide was further acidified to a pH of about 3.0 and 37.8 g. of impure ω-carboxypelargonyl dicyandiamide was obtained as a gelatinous material.

Example 7

(A) *Adipyl bis-dicyandiamide*

(B) *ω-Carboxy-n-valeryl dicyandiamide*

To 109 g. of dicyandiamide suspended in a mixture of 150 cc. of water and 400 cc. of acetone was added 240 cc. of aqueous 50% sodium hydroxide. 92 g. (0.5 mole) of crude adipyl chloride prepared by treating adipic acid with a slight excess of thionyl chloride was added slowly over a period of about one hour during which time the temperature was maintained at about 5° C. and the reaction mixture was well stirred. The clear solution was then made neutral with hydrochloric acid and adipyl bis-dicyandiamide was precipitated as a finely divided solid. The product was filtered, washed and dried in a desiccator.

The filtrate from the above precipitation was acidified to a pH of about 3 whereupon ω-carboxy-n-valeryl dicyandiamide was precipitated. The product was filtered, recrystallized from methanol, recovered and dried. On heating a sample of the product was found to decompose at about 170° C.

Example 8

*p-Nitrobenzoyl dicyandiamide*

18.5 g. of p-nitrobenzoyl chloride was dissolved in 50 cc. of acetone and added to a cold mixture of 20 cc. of 50% sodium hydroxide, 10 g. of dicyandiamide, 50 cc. of acetone and 20 cc. of water. The temperature was kept at 5–10° C. and the addition was complete in ½ hour. The mixture was then diluted with water, neutralized, and filtered. The material was then purified by dissolving in an excess of potassium hydroxide solution and cooling, whereupon the potassium salt of p-nitrobenzoyl dicyandiamide was precipitated. The acyl dicyandiamide was recovered from its salt by dissolving in water and neutralizing with hydrochloric acid. On analysis the product compared with the theoretical analysis of p-nitrobenzoyl dicyandiamide as follows:

|  | Per cent C | Per cent H | Per cent N |
|---|---|---|---|
| p-Nitrobenzoyl dicyandiamide | 46.35 | 3.0 | 30.04 |
| Found | 46.62 | 3.41 | 30.49 |

Example 9

*ω-Carboxypropionyl dicyandiamide*

29.2 g. of succinic anhydride was dissolved in 100 cc. of acetone and added to a cooled mixture of 33.6 g. of dicyandiamide, 72 cc. of a 50% aqueous solution of sodium hydroxide, 25 cc. of water and 50 cc. of acetone with stirring over a period of ¾ hour while maintaining the temperature of the reaction mixture between 5–8° C. At the end of this time 50 cc. of water were added and the mixture stirred continuously for ½ hour at 0–5° C. The mixture was then diluted with water, neutralized carefully with concentrated HCl and the bulk of the acetone removed. The product, ω-carboxy-propionyl dicyandiamide, was recovered by adjusting the resulting solution to a pH of about 3 and cooling. It was further purified by redissolving in an alkaline solution and reprecipitating at a pH of about 3.

Example 10

*o-Carboxybenzoyl dicyandiamide*

126 g. of dicyandiamide was added to a mixture of 100 cc. of water and 300 cc. of acetone. 280 cc. of a 50% aqueous solution of sodium hydroxide was then added at 5–8° C. 180 g. of powdered phthalic anhydride was added to the reaction mixture in the course of ½ to ¾ hours at 5–8° C. and the mixture stirred at this temperature for ½ hour more. 500 cc. of water was then added and then sufficient concentrated HCl to make the solution neutral. Most of the acetone was then removed under vacuum. The product, o-carboxybenzoyl dicyandiamide, was recovered by acidifying the resulting solution to a pH of about 3. Upon filtering, washing with water and drying, the product was obtained with a 74% yield. A sample, purified by twice dissolving in alkali and precipitating it at a pH of 3, was found to decompose on heating to a temperature of 136–138° C., and analyzed 24.63% nitrogen which compared well with the calculated values of 24.13% nitrogen for o-carboxylbenzoyl dicyandiamide.

Example 11

*p-Hydroxylbenzoyl dicyandiamide*

70 g. of dicyandiamide suspended in 70 cc. of water was cooled to 10° C. and 300 cc. of an aqueous solution of 50% sodium hydroxide added with stirring. 250 cc. of acetone was then added and was followed by the addition of 100 g. (0.5 mole) of crude p-acetoxybenzoyl chloride,

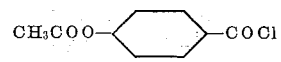

with stirring over a period of about 1 hour while maintaining the temperature of the reaction mixture between 10–25° C. The mixture was then diluted with water, neutralized with acetic acid and the precipitate which formed separated by filtration. The solid product was purified by dissolving in an alkaline solution, filtering and neutralizing with acetic acid. The filter cake was then washed with acetone to remove all but a trace of color. The product, p-hydroxybenzoyl dicyandiamide, was recovered with a 42% yield.

Although we have described the preparation and isolation of various acyl dicyandiamides, the salts of these compounds may also be readily prepared. As stated before, the alkali metal and alkaline earth metal salts of acylated dicyandiamides are formed in the reaction mixture and, if desired, they may be isolated as such by merely evaporating away the solvent. Other salts of acylated dicyandiamides may also be prepared and are included within the purview of our invention. Salts of metals such as zinc, aluminum, cadmium, etc. may be prepared by simply treating the acyl dicyandiamides with a desired metal oxide, hydroxide, carbonate or an alcoholate or by double decomposition methods. Ammonium salts and organic base salts such as those of pyridine, methylamine, dibutylamine, dodecylamine, morpholine, guanylurea, biguanide, phenyl biguanide, guanidine, N,N-dimethyl guanidine, etc. may also be prepared.

The compounds of the present invention are for the most part colorless solids, the alkyl and aryl acylated dicyandiamides being in the form of plate-like crystals when purified. The carboxymethylene and carboxy-arylene acylated dicyandiamides and the alkylene and arylene bis-acyl dicyandiamides are, however, amorphous in character. These latter compounds are also more insoluble in water and organic solvents than the other members of the group.

The acyl dicyandiamides of the present invention are useful as intermediates in the preparation of organic compounds, as for example, acylated guanylureas and guanides. They are also useful as intermediates in the preparation of azo dyes, resins and pharmaceuticals. They may also be reacted with methylated methylol melamine in the production of textile finishing agents having superior characteristics. Other uses of these new compounds will suggest themselves to the skilled chemist.

What we claim is:

1. A method of acylating dicyandiamide which comprises mixing together and reacting at a temperature not in excess of about 60° C. a member of the group consisting of halides and anhydrides of carboxylic acids, dicyandiamide, a member of the group consisting of water-soluble alkali-metal hydroxides and alkaline earth metal hydroxides, and water, the amount of water being not substantially in excess of that necessary to dissolve the reactants.

2. A method of acylating dicyandiamide which comprises mixing together and reacting at a temperature not in excess of about 60° C. a member of the group consisting of halides and anhydrides of carboxylic acids, dicyandiamide, a member of the group consisting of water-soluble alkali-metal hydroxides and alkaline earth metal hydroxides, and water, the amount of water being not substantially in excess of that necessary to dissolve the reactants, and thereafter neutralizing the product with an acid to obtain a free acyl dicyandiamide.

3. A method of acylating dicyandiamide which comprises mixing together and reacting at temperatures not in excess of about 60° C. a halide of a carboxylic acid, dicyandiamide, an alkali metal hydroxide, water and acetone, the amount of water and acetone being not substantially in excess of that necessary to dissolve the reactants.

4. A method of acylating dicyandiamide which comprises mixing together and reacting at a temperature not in excess of about 60° C. a carboxylic acid chloride, dicyandiamide, sodium hydroxide, water and acetone, the amount of water and acetone being not substantially in excess of that necessary to dissolve the reactants.

5. A method of acylating dicyandiamide to obtain aliphatic acyl dicyandiamides which comprises mixing together and reacting a chloride of an aliphatic carboxylic acid, dicyandiamide, an alkali metal hydroxide, and water, the amount of water being not substantially in excess of that necessary to dissolve the reactants.

6. A method of acylating dicyandiamide to obtain aromatic acyl dicyandiamides which comprises mixing together and reacting a chloride of an aromatic carboxylic acid, dicyandiamide, an alkali metal hydroxide, and water, the amount of water being not substantially in excess of that necessary to dissolve the reactants.

7. A method of acylating dicyandiamide to obtain acetyl dicyandiamide which comprises mixing together and reacting acetic anhydride, dicyandiamide, and an alkali-metal hydroxide, in the presence of a small amount of water at temperatures not in excess of about 60° C., the amount of water being not substantially in excess of that necessary to dissolve the reactants.

8. A method of acylating dicyandiamide to obtain benzoyl dicyandiamide which comprises mixing together and reacting benzoyl chloride, dicyandiamide, an alkali-metal hydroxide and water at temperatures not in excess of about 60° C., the amount of water being not substantially in excess of that necessary to dissolve the reactants.

9. A method of acylating dicyandiamide which comprises mixing together and reacting at a temperature not in excess of about 60° C. a member of the group consisting of halides and anhydrides of carboxylic acids, dicyandiamide, a member of the group consisting of water-soluble, alkali-metal hydroxides and alkaline earth metal hydroxides, water and a non-hydroxylated organic solvent, the amount of water being less than that necessary to dissolve the reactants.

10. The new compounds formed by mixing together and reacting at temperatures not in excess of about 60° C. a member of the group consisting of halides and anhydrides of carboxylic acids, dicyandiamide, a member of the group consisting of water-soluble alkali-metal hydroxides and alkaline earth metal hydroxides and water, the amount of water being not substantially in excess of that which is necessary to dissolve the reactants.

11. The new compounds formed by neutralization of the reaction product obtained by mixing togethed and reacting at temperatures not in excess of about 60° C. a halide of a carboxylic acid, dicyandiamide, a water-soluble alkali-metal hydroxide and water and acetone, the amount of water and acetone being not substantially in excess of that which is necessary to dissolve the reactants.

12. The new compounds formed by mixing together and reacting at a temperature not in excess of about 60° C. a carboxylic acid chloride, dicyandiamide, sodium hydroxide and water, the amount of water being not substantially in excess of that required to dissolve the reactants.

13. The new compounds formed by neutralization of the reaction product obtained upon mixing together and reacting at temperatures not in excess of about 60° C. a carboxylic acid chloride, dicyandiamide, sodium hydroxide and water, the amount of water being not substantially in excess of that required to dissolve the reactants.

14. Cationic salts of the new compounds of claim 11.

15. The new compound formed by mixing together and reacting at a temperature not in excess of about 60° C. benzoyl chloride, dicyandiamide, an alkali-metal hydroxide, and a small amount of water.

DONALD W. KAISER.
JACK T. THURSTON.